(12) United States Patent
Hantke et al.

(10) Patent No.: US 7,296,929 B2
(45) Date of Patent: Nov. 20, 2007

(54) LINEAR GUIDE UNIT

(75) Inventors: Stefan Hantke, Sulzbach (DE); Peter Lutz, Kottweiler (DE); Martin Menges, Homburg (DE)

(73) Assignee: Ina-Schaeffler KG, Herzogenaurach (DE)

( * ) Notice: Subject to any disclaimer, the term of this patent is extended or adjusted under 35 U.S.C. 154(b) by 202 days.

(21) Appl. No.: 11/185,502

(22) Filed: Jul. 20, 2005

(65) Prior Publication Data
US 2006/0018572 A1    Jan. 26, 2006

(30) Foreign Application Priority Data
Jul. 21, 2004  (DE) ............... 10 2004 035 211

(51) Int. Cl.
*F16C 29/06* (2006.01)
(52) U.S. Cl. ..................................... 384/44
(58) Field of Classification Search ............... 384/44, 384/43, 45; 464/168
See application file for complete search history.

(56) References Cited

U.S. PATENT DOCUMENTS

| 6,287,005 | B1 | 9/2001 | Teramachi |
| 2001/0048775 | A1 | 12/2001 | Michioka |

FOREIGN PATENT DOCUMENTS

| DE | 31 53 202 C2 | 1/1982 |
| DE | 198 26 703 A1 | 1/1999 |
| DE | 198 30 578 A1 | 2/1999 |
| EP | 0 838 602 B1 | 4/1998 |
| EP | 1 039 158 A2 | 9/2000 |

*Primary Examiner*—Lenard A. Footland
(74) *Attorney, Agent, or Firm*—Charles A. Muserlian

(57) ABSTRACT

The invention proposes a linear guide unit comprising a guide carriage (1) that is mounted through rollers (3) for sliding on a guide rail (2), and further comprising a roller chain (8) comprising a cage (8*a*) for receiving the rollers (3), said cage being formed by spacers (16) arranged between adjacent rollers (3) and flexible belts (17) arranged at two front ends of the rollers (3) for connecting the spacers (16) to one another, said roller chain (8) being arranged for rotating in an endless roller channel (7) comprising a load-bearing section (10), in which the rollers (3) roll under load on raceways (4, 11) of the guide carriage (1) and of the guide rail (2), a return section (12), that is arranged substantially parallel to the load-bearing section (10) and in which the rollers (3) of the roller chain (8) are unloaded, and two deflecting sections (13) that connect the return section (12) and the load-bearing section (10) endlessly to each other, said endless roller channel (7) comprising lateral rims (14) at both front ends of the rollers (3) for guiding the rollers (3), each lateral rim (14) comprising a groove (15) for receiving one of the belts (17) of the cage (8*a*), said groove (15) comprising a groove bottom (20), an inner groove wall (19) for an inner belt side of the belt (17) and an outer groove wall (18) situated opposite the inner groove wall (19) for an outer belt side of the belt (17), wherein the outer groove wall (18) and the inner groove wall (19) of the groove (15) in the deflecting section (13) are made on separate parts.

8 Claims, 3 Drawing Sheets

LINEAR GUIDE UNIT

FIELD OF THE INVENTION

The invention concerns a linear guide unit comprising a guide carriage that is mounted through rollers for sliding on a guide rail, and further comprising a roller chain comprising a cage for receiving the rollers, said cage being formed by spacers arranged between adjacent rollers and flexible belts arranged at two front ends of the rollers for connecting the spacers to one another, said roller chain being arranged for rotating in an endless roller channel comprising a load-bearing section, in which the rollers roll under load on raceways of the guide carriage and of the guide rail, a return section, that is arranged substantially parallel to the load-bearing section and in which the rollers of the roller chain are unloaded, and two deflecting sections that connect the return section and the load-bearing section endlessly to each other, said endless roller channel comprising lateral rims at both front ends of the rollers for guiding the rollers, each lateral rim comprising a groove for receiving one of the belts of the cage, said groove comprising a groove bottom, an inner groove wall for an inner belt side of the belt and an outer groove wall situated opposite the inner groove wall for an outer belt side of the belt.

Such linear rolling bearings are used, for instance, in the field of machine tools and in handling equipment.

A linear guide unit of the pre-cited type is disclosed, for instance in EP 0 838 602 B1. FIG. 9 of this document shows in a partial longitudinal section, a linear guide unit in which an inner deflector and an outer deflector of the deflecting section are configured on separate parts. The lateral rim is endlessly configured along the roller channel, the groove being shaped into this integrally formed part. In the manufacturing of such a linear guide unit out of a plastic by an injection molding method, a complex injection mold is required. In the present prior art, the guide carriage has a carrier body made of steel that comprises bores for forming the return section. The injection mold extends likewise into these bores. The plastic material is also injected into the space between the bore wall and the inserted part of the injection mold. It is difficult to extract this part of the injection mold inserted into the bore without damaging the groove in the deflecting section, so that it becomes necessary to provide complex injection molds.

OBJECTS OF THE INVENTION

It is an object of the invention to provide a linear guide unit of the pre-cited type that can be manufactured in a simple manner.

This and other objects and advantages of the invention will become obvious from the following detailed description.

SUMMARY OF THE INVENTION

The invention achieves the above objects by the fact that the outer groove wall and the inner groove wall of the groove in the deflecting section are formed on separate parts. When the outer groove wall is formed on a separate part, the groove bottom, the inner groove inner wall and an inner part of the lateral rim can be formed, for example, in a known manner in one piece with the return section by injection molding. The part of the injection mold inserted into the return section can be extracted without any problem by pulling it out in a straight line without interference by the groove in the region of the deflecting section. The omission of the outer groove wall on this part of the guide carriage makes this simple extraction possible.

It has already been mentioned that in the prior art linear guide unit, an inner deflector and an outer deflector of the deflecting section are formed on separate parts. According to one proposition of the invention, the outer deflector comprises a deflecting shell constituting one of these parts that comprises the outer groove wall of the groove of the deflecting section. This deflecting shell can be manufactured separately and then disposed on the guide carriage to complete the endless roller channel. In this embodiment of the invention, too, a part of the injection mold inserted into the bore of the return section can be extracted without any problem.

In addition to the outer groove wall, this deflecting shell can also comprise the groove bottom of the groove. Advantageously, the deflecting shell can likewise comprise an outer deflecting track for the rollers. In the region of the deflecting section, the outer groove wall, the groove bottom and the outer deflecting track for the rollers are then arranged on the deflecting shell. This deflecting shell can be advantageously made by injection in an injection mold.

The groove divides the lateral rim into an inner lateral rim part and an outer lateral rim part. Advantageously, the deflecting shell can comprise the outer lateral rim part of the lateral rim. In this way, a major part of the guide surfaces for the roller chain on the deflecting shell can be made in a single manufacturing step. This means that the groove bottom, the outer groove wall of the groove, the outer deflecting track and the outer lateral rim part of the lateral rim can be formed integrally on the deflecting shell.

The carrier body of the guide carriage normally comprises end caps that comprise the deflecting shells. The carrier body together with the caps can form the guide carriage.

The inner groove wall of the groove of the deflecting section, the inner deflector of the deflecting section and the inner lateral rim part of the lateral rim of the deflecting section can be connected integrally to one another to thus constitute one of the aforesaid separate parts. This part can be injected in a simple manner onto the carrier body by injection molding. Particularly as far as the return section is concerned, a part of the injection mold inserted therein can be extracted again without difficulty.

The invention will now be described more closely with reference to embodiments of the invention illustrated in the appended drawing that contains a total of 8 figures.

DETAILED DESCRIPTION OF THE DRAWING

Figure 1:
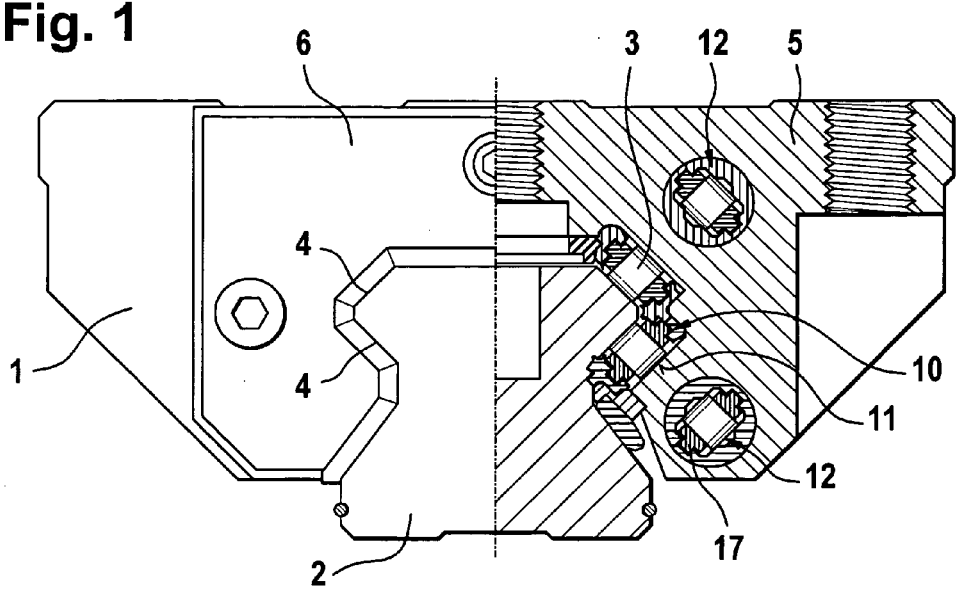
FIG. 1 shows a cross-section through a linear guide unit of the invention.
Figure 2:
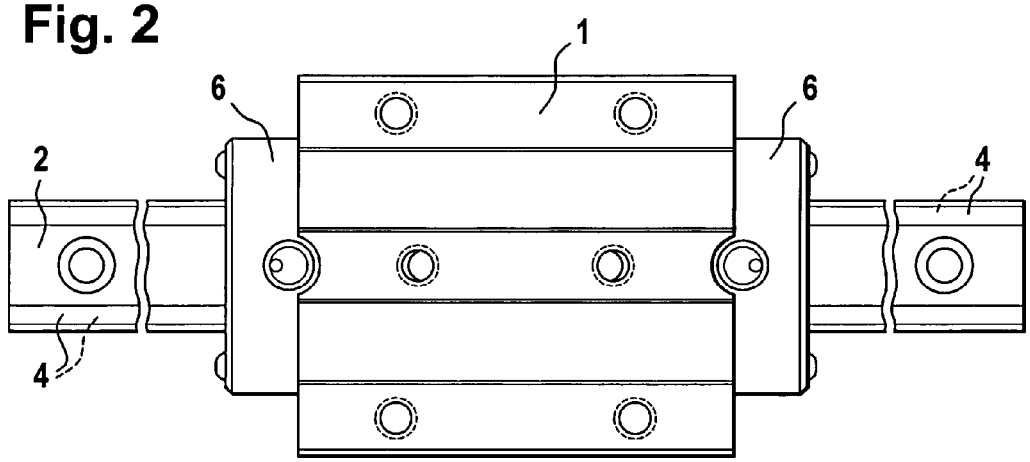
FIG. 2 is a top view of the linear guide unit of the invention shown in FIG. 1.

FIG. 1 shows the linear guide unit of the invention in a cross-sectional view. A guide carriage 1 is mounted through rollers 3 for sliding on a guide rail 2. On each of its long sides, the guide rail 2 comprises two raceways 4 that are arranged approximately at right angles to each other for receiving the rollers 3. FIG. 2 shows this linear guide unit in a top view.

Figure 3:
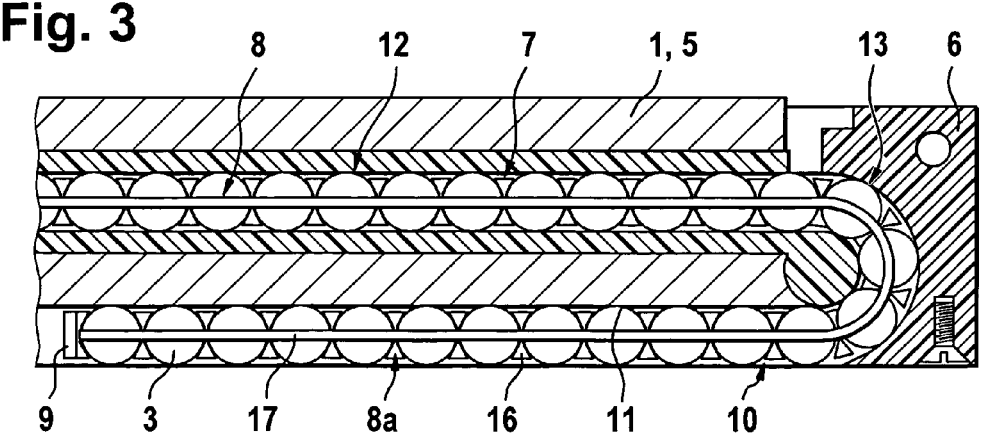
FIG. 3 shows a partial longitudinal section through the linear guide unit of the invention.

FIG. 3 shows that the guide carriage 1 comprises a carrier body 5 and caps 6 arranged on front ends in traveling direction. FIG. 3 also shows in a longitudinal section, an endless roller channel 7 in which a roller chain 8 is arranged for endless rotation. In the present case, the roller chain 8 comprises two opposing ends 9, one of which is visible in FIG. 3. The roller channel 7 is made up of a load-bearing section 10, in which the rollers 3 roll under load, on the one hand on raceways 4 of the guide rail 2 and on the other hand, on raceways 11 of the guide carriage 1. The endless roller channel 7 further comprises a return section 12 that is substantially parallel to the load-bearing section 10 and in which the rollers 3 of the roller chain 8 are unloaded. The endless roller channel 7 also comprises two deflecting sections 13, one of which is illustrated in FIG. 3. The deflecting sections 13 connect the load-bearing section 10 and the return section 11 endlessly to each other. The endless roller channel 7 further comprises, at both front ends of the rollers 3, lateral rims 14 on which the rollers 3 are guided. These lateral rims 14 are configured on all sections of the roller channel 7.

The cage 8a comprises spacers 16 that are arranged between every two adjacent rollers 3. These spacers 16 can be seen in FIG. 3. A belt 17 of the roller chain 8 is arranged at each front end of the rollers 3 along the roller channel 7, said belts 17 connecting the spacers 16 integrally to one another. The belts 17 are illustrated in FIGS. 1 and 3. The belt 17 has an outer belt side and an inner belt side, the outer belt side being arranged on the outer periphery of the endless roller chain 8, and the inner belt side being arranged on the inner periphery of the roller chain 8.

Figure 4:
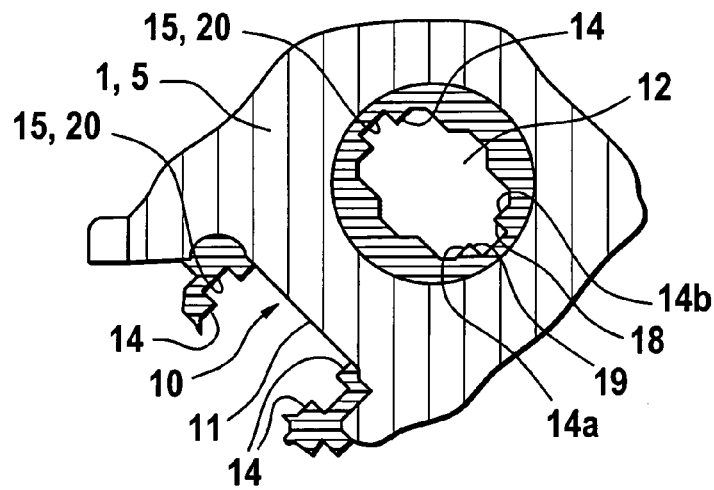
FIG. 4 is an enlarged representation of a detail of the cross-section of FIG. 1.

It can be seen in FIG. 4 that the lateral rim 14 provided for the rollers 3 comprises a groove 15. In the illustration, the parts of the lateral rim 14 situated in the return section 12 and in the load-bearing section 10 are shown with the groove 15. The groove 15 is provided for receiving a belt 17 of the cage 8a. The groove 15 comprises an outer groove wall 18 and an inner groove wall 19. The belt 17 is guided with its inner belt side on the inner groove wall 19 of the groove 15, and with its outer belt side on the outer groove wall 18 of the groove 15. The groove 15 further comprises a groove bottom 20. FIG. 4 further shows that the groove 15 divides the lateral rim 14 into an inner lateral rim part 14a and an outer lateral rim part 14b.

Figure 5:
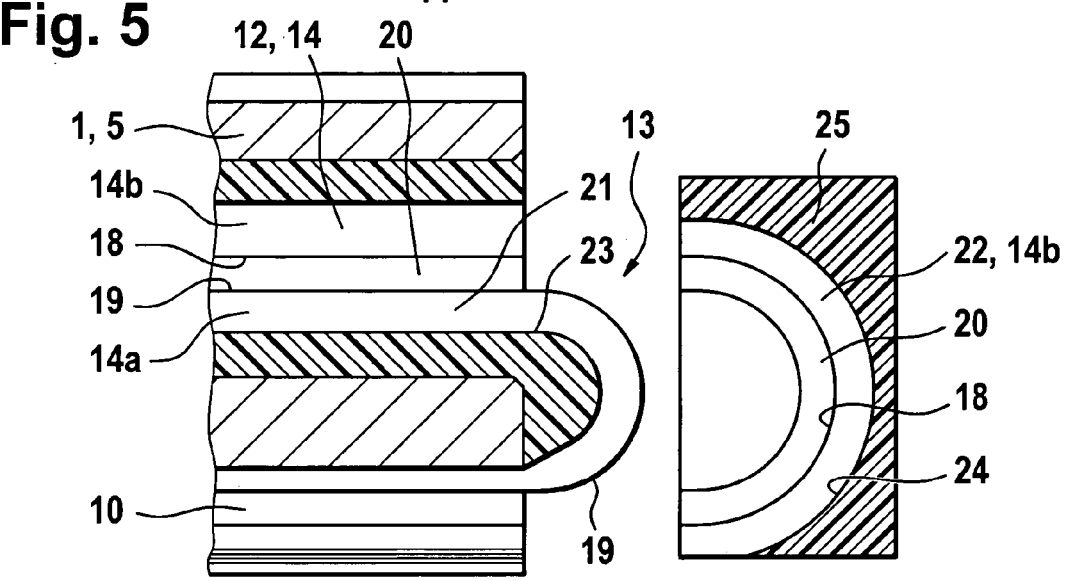
FIG. 5 shows the partial longitudinal section of FIG. 3 in an enlarged representation, with separately illustrated elements.

FIG. 5 shows the linear guide unit of the invention in a partial longitudinal section, the deflecting section 13 being shown with all its details. The deflecting section 13 comprises an inner deflector 21 and an outer deflector 22. The inner deflector 21 comprises an inner deflecting track 23 for the rollers 3, and the outer deflector 22 comprises an outer deflecting track 24 for the rollers 3. The outer deflector 22 is formed in the present embodiment by a deflecting shell 25 that is made out of plastic by injection molding.

On the deflecting shell 25 are formed integrally the outer deflecting track 24 for the rollers 3, the outer lateral rim part 14b for the rollers 3, as well as the outer groove wall 18 and the groove bottom 20.

The inner deflector 21 together with the return section 12 and the lateral rims 14 of the load-bearing section 10 are formed out of plastic integrally on the carrier body 5 by injection molding. It can be clearly seen in FIG. 5 that the inner groove wall 19 together with the inner lateral rim part 14a has an endless, continuous configuration. The groove bottom 20 and the outer groove wall 18, in contrast, end at the end of the carrier body 5. When the deflecting shell 25 is placed on the carrier body 5, the configuration of the endless roller channel 7 is completed.

In this roller recirculating unit of the invention, the injection mold can be extracted from the return section 12 and the load-bearing section 10 as well as out of the region of the deflecting section 13 without any problem after termination of the injection operation. Special dissociable mold slides are no longer required here.

Figure 6:
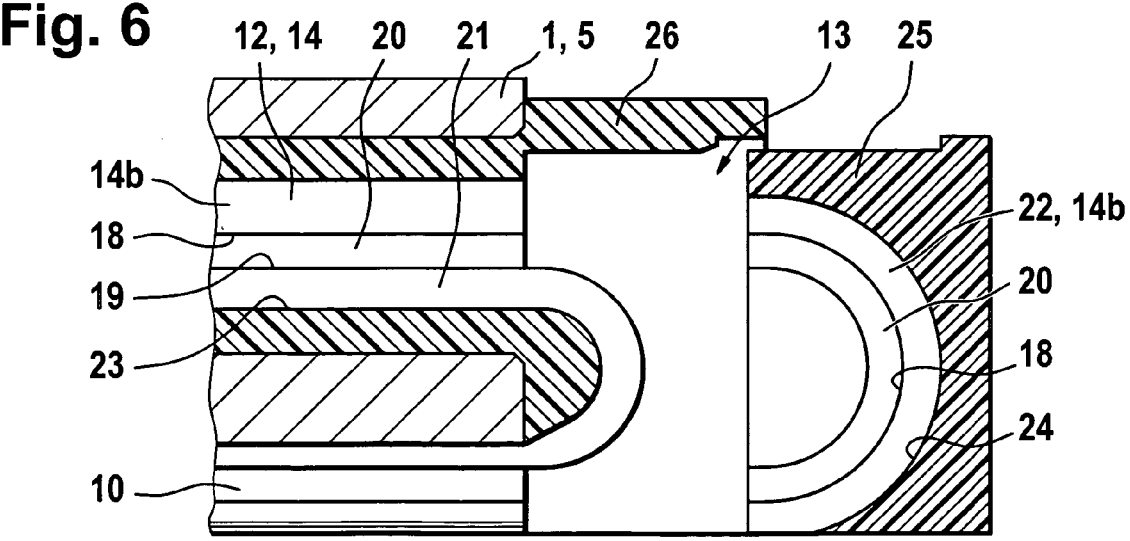
FIG. 6 shows a longitudinal section similar to FIG. 5, but of another embodiment of the linear guide unit of the invention.

FIG. 6 shows in a partial sectional view, a further linear guide unit of the invention. Differently from the linear guide unit of the invention described above, the carrier body 5 of this embodiment comprises a centering extension 26 into which the deflecting shell 25 can be inserted, the deflecting shell 25 being centered on the centering extension 26.

Figure 7:
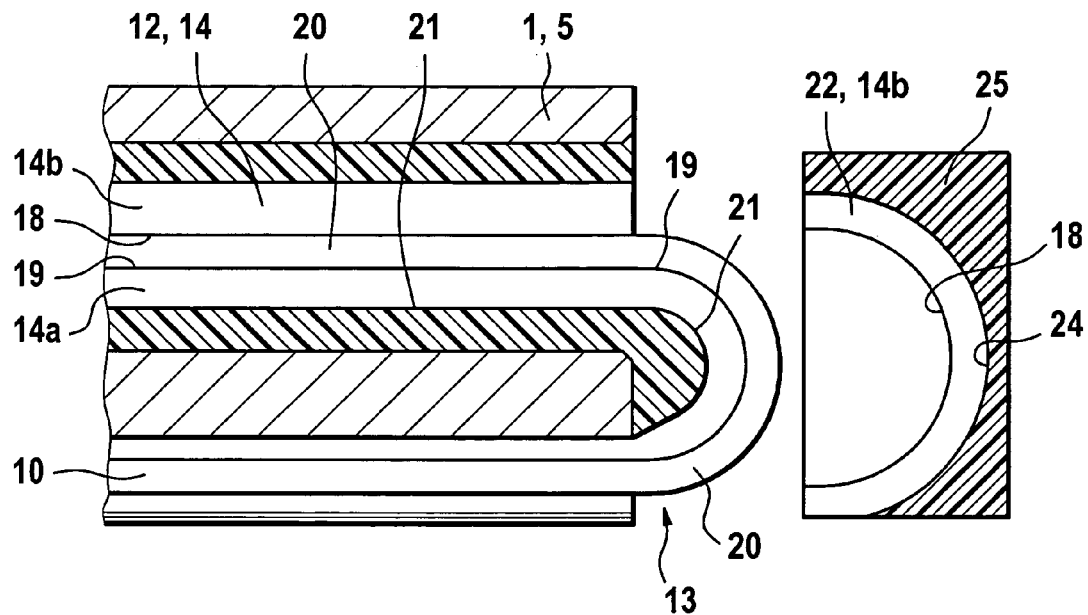
FIG. 7 shows a longitudinal section similar to those shown in FIGS. 5 and 6, but of still another embodiment of the linear guide unit of the invention.

FIG. 7 shows a further embodiment of the linear guide unit of the invention that differs from the linear guide of FIGS. 1-5 mainly by the fact that the deflecting shell 25 comprises only the outer deflecting track 24, the outer lateral rim part 14b and the outer groove wall 18. The groove bottom 20 is formed integrally on the inner deflector 21.

Figure 8:
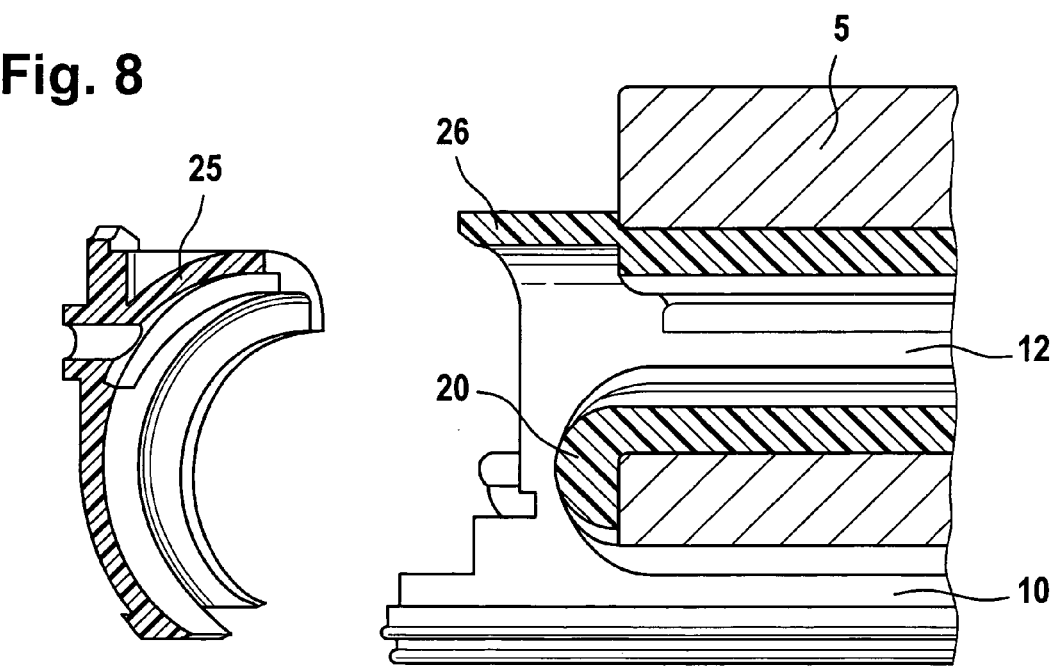
FIG. 8 shows a partial longitudinal section similar to FIG. 7, but in a perspective representation.

FIG. 8 shows a perspective representation of the linear guide unit of FIG. 7. This figure very clearly shows the centering extension 26 that serves to center the deflecting shell 25.

The invention claimed is:

1. A linear guide unit comprising a guide carriage that is mounted through rollers for sliding on a guide rail, and further comprising a roller chain comprising a cage for receiving the rollers, said cage being formed by spacers arranged between adjacent rollers and flexible belts arranged at two front ends of the rollers for connecting the spacers to one another, said roller chain being arranged for rotating in an endless roller channel comprising a load-bearing section, in which the rollers roll under load on raceways of the guide carriage and of the guide rail, a return section, that is arranged substantially parallel to the load-bearing section and in which the rollers of the roller chain are unloaded, and two deflecting sections that connect the return section and the load-bearing section endlessly to each other, said endless roller channel comprising lateral rims at both front ends of the rollers for guiding the rollers, each lateral rim comprising a groove for receiving one of the belts of the cage, said groove comprising a groove bottom, an inner groove wall for an inner belt said of the belt and an outer groove wall situated opposite the inner groove wall for an outer belt side of the belt, wherein the outer groove wall and the inner groove wall of the groove in the deflecting section are made on separate parts, wherein an inner deflector and an outer deflector of the deflecting section are configured on separate parts, the inner groove wall of the groove of the deflecting section, the inner deflector of the deflecting section and the inner lateral rim part of the lateral rim of the deflecting section being made in one piece with one another and thus constituting one of said separate parts, wherein the return section and the inner deflector of the deflecting section are made in one piece with one another out of plastic by injection molding and constitute one of said separate parts, which part is injected onto the carrier body by injection molding.

2. A linear guide unit of claim 1, wherein the outer deflector of the deflecting section comprises a deflecting shell constituting the other part comprises the outer groove wall of the groove of the deflecting section.

3. A linear guide unit of claim 2, wherein the deflecting shell comprises the groove bottom of the groove.

4. A linear guide unit of claim 2, wherein the deflecting shell comprises an outer deflecting track for the rollers.

5. A linear guide unit of claim 2, wherein the deflecting shell is made out of plastic by injection molding.

6. A linear guide unit of claim 5, wherein the groove bottom and the outer groove wall of the groove and the outer deflecting track are made in one piece with one another.

7. A linear guide unit of claim 1, wherein the groove divides the lateral rim into an inner lateral rim part and an outer lateral rim part.

8. A linear guide unit of claim 1, wherein the deflecting shell comprises the outer lateral rim part of the lateral rim.

* * * * *